(12) United States Patent
Leveille et al.

(10) Patent No.: US 8,990,717 B2
(45) Date of Patent: Mar. 24, 2015

(54) CONTEXT-AWARE CHARTING

(75) Inventors: Jeff Leveille, Ottawa (CA); Andrew Phan, Ottawa (CA); Duc Vuong, Ottawa (CA); Toufic Milan, Ottawa (CA); Christopher Crim, San Jose, CA (US); Clay Maeckel, San Jose, CA (US); Richard L. Kalman, Jr., San Jose, CA (US)

(73) Assignee: Apple Inc., Cupertino, CA (US)

( * ) Notice: Subject to any disclaimer, the term of this patent is extended or adjusted under 35 U.S.C. 154(b) by 999 days.

(21) Appl. No.: 12/539,966

(22) Filed: Aug. 12, 2009

(65) Prior Publication Data

US 2011/0041087 A1    Feb. 17, 2011

(51) Int. Cl.
*G06F 3/048* (2013.01)
*G06T 11/20* (2006.01)
*G06F 3/0486* (2013.01)

(52) U.S. Cl.
CPC ............ *G06T 11/206* (2013.01); *G06F 3/0486* (2013.01); *G06F 3/048* (2013.01)
USPC ........... 715/764; 715/215; 715/769; 715/765; 715/780; 345/440

(58) Field of Classification Search
CPC ................................ G06F 3/048; G06F 3/0486
USPC ........... 715/764, 765, 780, 215, 769; 345/440
See application file for complete search history.

(56) References Cited

U.S. PATENT DOCUMENTS

| | | | |
|---|---|---|---|
| 6,529,217 B1 * | 3/2003 | Maguire et al. | 715/769 |
| 2007/0130517 A1 * | 6/2007 | Wu | 715/530 |
| 2008/0033876 A1 * | 2/2008 | Goldman et al. | 705/42 |
| 2008/0192056 A1 * | 8/2008 | Robertson et al. | 345/440 |
| 2008/0320403 A1 * | 12/2008 | Glaberson | 715/763 |
| 2010/0235771 A1 * | 9/2010 | Gregg, III | 715/769 |

* cited by examiner

*Primary Examiner* — Patrick Riegler
*Assistant Examiner* — Phuong Nguyen
(74) *Attorney, Agent, or Firm* — Fish & Richardson P.C.

(57) ABSTRACT

Methods, program products, and systems for displaying context-aware charts are described. In context-aware charts, content of a chart can reflect a context of the chart. A charting object can be defined using a data series. The system can dynamically determine what subset of a data source should be used for the data series, depending on where the chart object is placed in a layout, form or other display area. Therefore, a single chart definition can be used to display various charts based on the context of the chart. When a chart object is moved from one data area to a new data area, the system can change the source of the data series such that the data series of the chart corresponds to a different subset of the data source.

18 Claims, 9 Drawing Sheets

| City | Year | HappyPeople | SadPeople | AvgHappyPeople |
|---|---|---|---|---|
| New York | 2007 | 100 | 40 | 50 |
| New York | 2008 | 80 | 80 | 50 |
| | | Average: 90 | | |
| Ottawa | 2006 | 30 | 10 | 50 |
| Ottawa | 2007 | 20 | 10 | 50 |
| Ottawa | 2008 | 10 | 20 | 50 |
| | | Average: 20 | | |
| San Jose | 2007 | 40 | 40 | 50 |
| San Jose | 2008 | 70 | 60 | 50 |
| | | Average: 55 | | |
| | | Average: 50 | | |

FIG. 4B

CONTEXT-AWARE CHARTING

TECHNICAL FIELD

This disclosure relates generally to database applications.

BACKGROUND

Many modern database tools integrate a database engine with a graphical user interface (GUI). The content of the database is formatted and displayed in the GUI according to a layout. The ability to visualize various amounts of information dynamically is an important asset for a knowledge worker who uses the database tools. Charting functions based on database content have been a significant component of various visualization tools. In conventional charting programs, a user defines a chart by designating a data series (e.g., a data source) for the chart. Once the data series is specified, the chart displays the same content using the same data series wherever a user puts the chart on a display. Therefore, in a database tool that contains multiple data sections, the user must create a separate chart for each data section, even when the configurations of the charts are substantially identical.

SUMMARY

Methods, program products, and systems for displaying context-aware charts are described. A charting object can be defined using one or more data series. The system can determine what data source should be used for the data series dynamically, depending on where the chart object is placed in a layout, form or other display area. Therefore, a single chart definition can be used to display various charts based on a context of the chart object. For example, when a chart object is moved from one data area to a new data area in a layout, the system can reinterpret the source of the data series such that the data series of the chart correspond to a different "slice" (e.g., subset) of data. The content of the chart can change to reflect the context of the chart.

In some implementations, a chart definition can be created on a system for a context-aware chart. The chart definition can include one or more series of data. The system include sections where the data presented from a total data set can be filtered and interpreted differently according to the characteristics (e.g., grouping) of each section. The data presented in the chart can also be adapted to the characteristics of that section. Therefore, the chart definition can be used to create charts whose content can vary depending on the context in which the chart is placed.

In some implementations, a chart can optionally be moved from a first data section to a second data section in a layout. The system can reformat the formatted view. Reformatting the formatted view can include updating the data series of the moved chart, such that the data series of the moved chart corresponds to a new "slice" of the total data set that corresponds to the second data section. The system can update the content of the chart using the updated data series. The updated chart can be displayed in the reformatted view.

In some implementations, a chart definition can be created on a system for a context-aware chart. The chart definition can include one or more data series. The system can display one or more charts in a formatted view. The formatted view can include data that are arranged into one or more data sections, each section having a level that measures the distance between the section and an innermost section of data. The charts can correspond to the chart definition and at least one of the data sections. When the data section to which the charts correspond is modified or removed, the system can reformat the formatted view. Reformatting can include updating the charts such the data series of the charts correspond to a data section that has a lower level (e.g., being closer to the innermost section) than the original data section.

The details of one or more implementations of context-aware charting are set forth in the accompanying drawings and the description below. Other features, aspects, and advantages of context-aware charting will become apparent from the description, the drawings, and the claims.

BRIEF DESCRIPTION OF THE DRAWINGS

FIGS. 4A and 4B illustrate exemplary data tables and view for context-aware charting.

Like reference symbols in the various drawings indicate like elements.

DETAILED DESCRIPTION

Context-Aware Charting Overview

Figure 1:
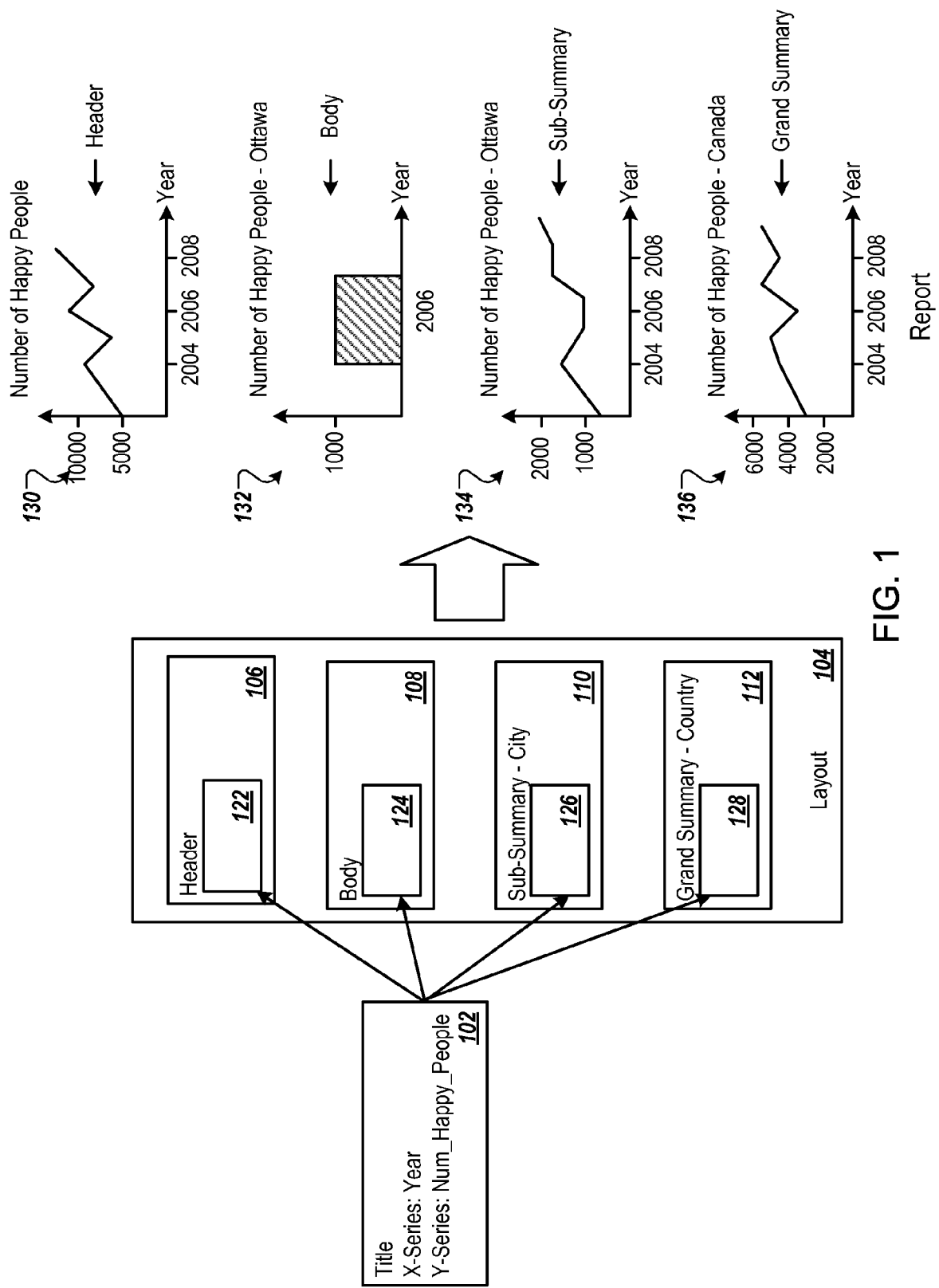
FIG. 1 is an overview of some exemplary implementations of context-aware charting.

FIG. 1 is an overview of some exemplary implementations of context-aware charting. For convenience, the exemplary implementations will be described with respect to a database reporting system that performs the techniques, and a user using a database application program.

From a high-level, chart definition 102 can include data series for an x-axis (e.g., year) and a y-axis (e.g., number of happy people) of a chart. Chart objects 122, 124, 126, and 128 can use the same chart definition 102. The system can determine what subset of data source should be used for the data series dynamically, depending on where chart objects 122, 124, 126, and 128 are placed.

For example, the system can use chart definition 102 to display a total number of happy people through years in chart 130 when chart object 122 is in a header section of a layout 104. The system can use the same chart definition 102 to display total number of happy people in Ottawa through years in chart 134, and total number of happy people in Canada through the years in chart 136, when chart object 122 is in a respective summary section. A user does not need to edit the data series in chart definition 102 in order to chart the different data—the system can determine the data source automatically, based on a context (e.g., placement) of a chart object.

Details of context-aware charting will be described below. A chart object can contain chart formatting information. An actual chart can contain graphics of actual data. The term "chart instance" will be used to refer to an actual chart.

A database reporting system can permit a user to edit and view formatted data through database application programs instead of directly accessing raw data stored in a database. A database application program can include various components, such as a query engine for retrieving data from the database, a layout editor for creating and editing layout 104 for formatting data, and a formatting engine for formatting and displaying the data using layout 104.

Layout 104 can include an arrangement of data fields, objects, pictures, and layout parts that represents varies ways information is organized and presented when a user browses, previews, or prints data records. Layout 104 can contain various parts. A layout part is a section of layout 104 that organizes or summarizes information. Some example layout parts are header section 106, body section 108, summary section 110, and summary section 112.

A user can use a layout editor to edit layout 104. The user can design different layouts for entering data, printing reports, displaying Web pages, etc. Editing layout 104 can include creating chart definition 102. Chart definition 102 can be associated with a chart object (e.g., 122, 124, 126, or 128), which can be used to generate chart instances on a formatted view. The user can put a chart object into various sections of layout 104. Chart definition 102 can include various information that defines or describes charts. For example, chart definition 102 can include a chart title, a chart type (e.g., pie chart, line chart, or bar chart), and one or more data series. The number of data series can depend on the chart type. For example, for some pie charts, one data series can be sufficient; however, for multi-dimensional charts, three or more data series can be specified.

Certain types of charts can be more useful in representing certain data series. For example, a pie chart can be convenient for visualizing percentages of parts to a whole. The pie chart can correspond to a data series of percentage values. A bar chart or line chart can be convenient for visualizing statistical numbers that change with time. The bar chart or line chart can correspond to a data series for time (e.g., years 2004-2009) and another data series for value (e.g., number of happy people in a statistical region). In the example given, chart definition 102 includes "year" (e.g., 2004, 2005, etc.) as x-axis series (e.g., data series for an x-axis) and "num_happy_people" (e.g., number of happy people) as y-axis series (e.g., data series for a y-axis).

Layout 104 can contain header section 106, which can include content and formatting information of one or more data fields that are to be displayed on top of the data retrieved from the database. Some exemplary data fields in header section 106 are boilerplates (e.g., texts, images), system information (e.g., a current date, name of the current user, etc.), and other information generally related to a displayed view. A user can insert chart object 122 into header section 106. Chart object 122 can be based on chart definition 102.

Layout 104 can also contain body section 108. Body section 108 can be a layout part, which can contain individual records retrieved from a database (e.g., the retrieved data). On layout 104, body section 108 can include placeholders for the individual records (e.g., rows from database tables). Body section 108 can be used to define display specifications for a repetition of data fields. For example, body section 108 can be used to display a statistical number of happy people in each city in each year. The repetition can be by city and by year. The user can insert chart object 124 into body section 108.

Layout 104 can also contain summary sections 110 and 112. Summary sections 110 and 112 can include inner summary section 110 and outer summary section 112, based on their locations relative to body section 108. "Inner" and "outer" summary sections are relative terms. An "outer" summary section can summarize data of an "inner" summary section. For example, inner summary section 110 can contain sums of number of happy people per city. Outer summary section 110 can contain sums of number of happy people per country. The sums in outer summary section 110 can be calculated based on the sums of happy people per city. Summary sections 110 and 112 can include a sub-summary section and a grand summary section. A sub-summary section can include a summary field that summarizes a particular data column based on a particular grouping. For example, inner summary section 110 can include a summary field that summarizes numbers of happy people in each year grouped by city (e.g., Ottawa, San Jose, or New York). Outer summary section 112 can include a summary field that summarizes numbers of happy people in each year grouped by country (e.g., USA, Canada, etc.). A grand summary section (e.g., an outer-most summary section) can include a data field that contains a grand total (e.g., number of happy people for all regions for all years). The user can insert chart objects 126 and 128 into summary sections 110 and 112, respectively.

In layout 104, each chart object 122, 124, 126, and 128 can be based on the same chart definition 102. However, because of their different placement in layout 104, each chart object 122, 124, 126, and 128 can each produce chart instances that correspond to different data. A chart instance can include a displayed or printed chart that is based on applying a chart definition of a chart object to actual data.

For example, chart object 122 can be placed in header section 106. Header section 106 does not contain repeating data. Therefore, in chart instance 130, which is displayed based on chart definition 102 and the position of chart object 122, the x-series data can be "year." The y-series data can be the total number of happy people of all cities.

Chart object 124 can be placed in body section 108. Body section 108 can be configured to repeat for ever city and for every year. Therefore, resulting chart instance 132 can represent a data point (e.g., the number of happy people in Ottawa in year 2006) in a data series. Chart instance 132, which is displayed based on chart definition 102 and the position of chart object 124, can be associated to every data row displayed in the report. For example, a single chart object 124 can result in multiple chart instances 132 being generated and displayed.

Chart object 126 can be placed in inner summary section 110. Inner summary section 110 can be configured to repeat for every city. Therefore, resulting chart instance 134 can represent a series data for a particular city (e.g., the number of happy people in Ottawa throughout the years). Chart instance 134, which is formatted based on chart definition 102 and the position of chart object 126, can be associated to every city displayed in the report. For example, a single chart object 126 can result in multiple chart instances 134 being generated and displayed, one for each city.

Chart object 128 can be placed in outer summary section 112. Outer summary section 112 can be configured to repeat for every country. Therefore, resulting chart instance 136 can represent a series data for a particular country (e.g., the number of happy people in Canada throughout the years). Chart instance 136, which is formatted based on chart definition 102 and the position of chart object 128, can be associated to every country displayed in the report. For example, a single chart object 128 can result in multiple chart instances 136 being generated and displayed, one for each country.

Therefore, as illustrated in FIG. 1 and the descriptions above, one feature of context-aware charting can be enabling chart definition 102 to produce chart instances 130, 132, 134, and 136 that correspond to various data, depending on where in layout 104 the user puts a chart object. The system can achieve this by identifying to which particular data section (e.g., body, sub-summary, grand-summary, etc.) that data series in chart definition 102 (e.g., y-series: "num_happy- _people") correspond, and generating chart instances 130, 132, 134, and 136 accordingly.

Moving Context-Aware Charts

Figure 2C:
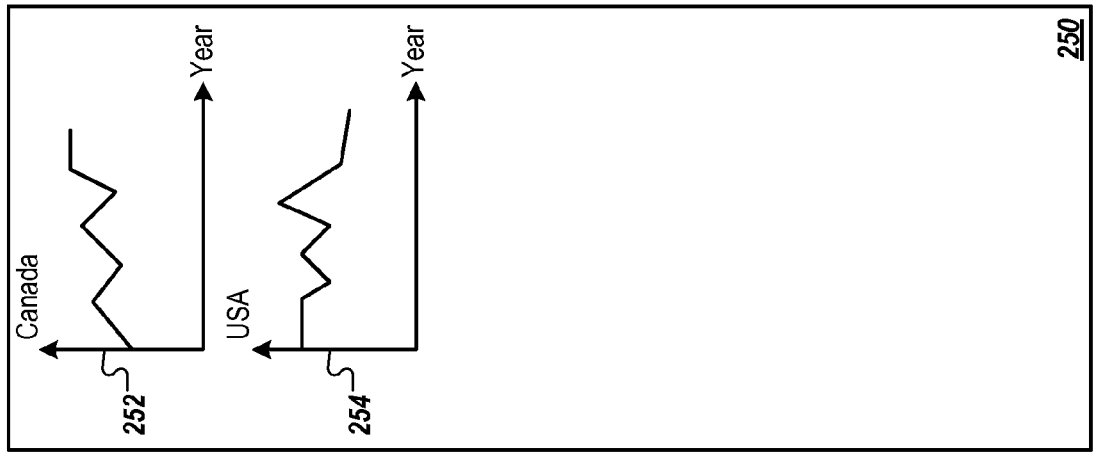
FIGS. 2A-2C illustrate exemplary implementations for moving context-aware chart objects in a layout.
Figure 2B:
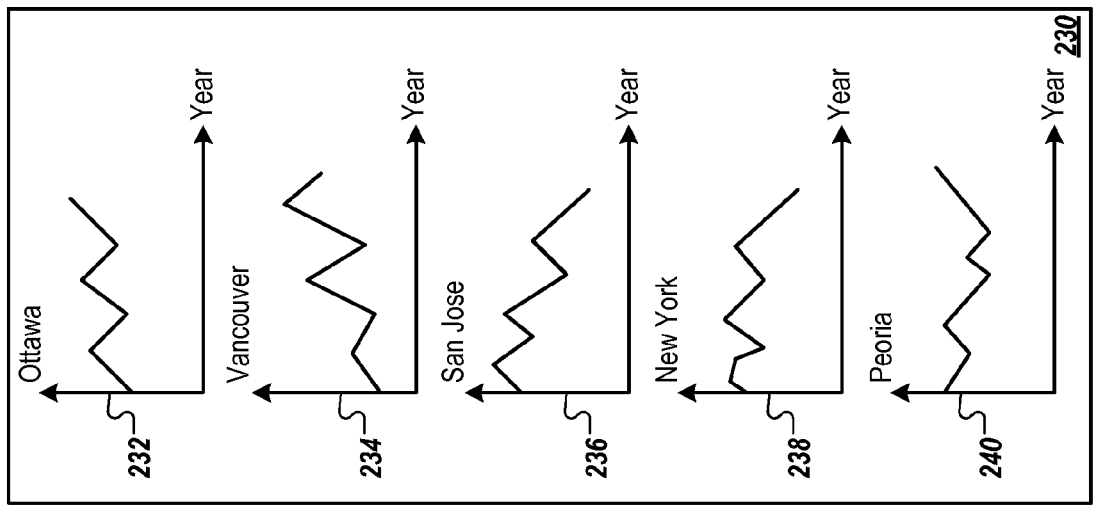
Figure 2A:
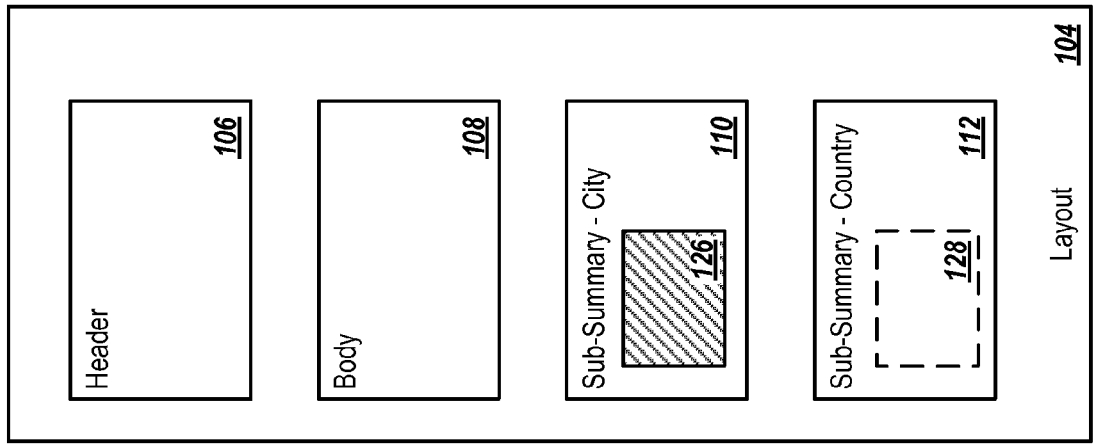

FIGS. 2A-2C illustrate exemplary implementations for moving context-aware chart objects in layout 104. When chart object 126 is moved from inner summary section 110 to outer summary section 112, the number of chart instances generated by the chart object as well as the content of the chart instances can change to reflect the move.

FIG. 2A illustrates layout 104, which contains header section 106, body section 108, inner summery section 110, and outer summary section 112. Summary sections 110 and 112 can contain sub-summary data fields that correspond to "city" and "country," respectively. Chart object 126 can be placed in inner summary section 110. A user can move chart object 126 from one section of layout 104 (e.g., inner summary section 110) to another section of layout 104 (e.g., outer summary section 112). The move can include removing chart object 126 from inner summary section 110 of layout 104 and adding new chart object 128 into outer summary section 112 of layout 104. The user can perform the move by using drag-and-drop on a user interface. A user is not required to edit chart definition 102 in order to move chart object 126.

FIG. 2B illustrates exemplary formatted view 230 generated based on layout 104, before the user moves chart object 126. For illustrative purposes, five sub-summary chart instances 232, 234, 236, 238, and 240 are shown. More or fewer sub-summary chart instances can be used. Header, footer, rows of data, section title and subtitle, and other information can be present in formatted view 230 but are not shown, for purpose of clarity. Sub-summary data and related charts can repeat for the group being sub-summarized. In this example, chart object 126 is located in summary section 110, which repeats based on a grouping by "city" (e.g., for each city, the data fields corresponding to that city are formatted according to summary section 110). Therefore, sub-summary chart instances 232, 234, 236, 238, and 240 can be repeated for cities in the database, e.g., Ottawa, Vancouver, San Jose, New York, and Peoria. Each sub-summary chart instance 232, 234, 236, 238, or 240 can be used to visualize data for the particular corresponding city. For example, sub-summary chart instance 232 can illustrate the number of happy people in Ottawa over the years.

FIG. 2C illustrates exemplary reformatted view 250 generated based on layout 104, after the user moves chart object 126 to a position that corresponds to chart object 128. Chart object 128 is now located in outer summary section 112, which repeats based on a grouping by "country." Therefore, sub-summary chart instances 252 and 254 can be repeated for countries in the database, e.g., Canada and USA. Each sub-summary chart instance 252 or 254 can be used to visualize data for the particular corresponding country. For example, sub-summary chart 252 can illustrate the number of happy people in Canada over the years.

Thus, chart object 126 and 128 can be used to visualize different content, even when they have the same chart definition (e.g., chart definition 102). When a user moves chart object 126 to a new position in layout 104, the user is not required to redefine the data series in the chart definition. The system can automatically determine a correct data series for charting, and format the charts accordingly.

Exemplary Context-Aware Charting Processes

Figure 3A:
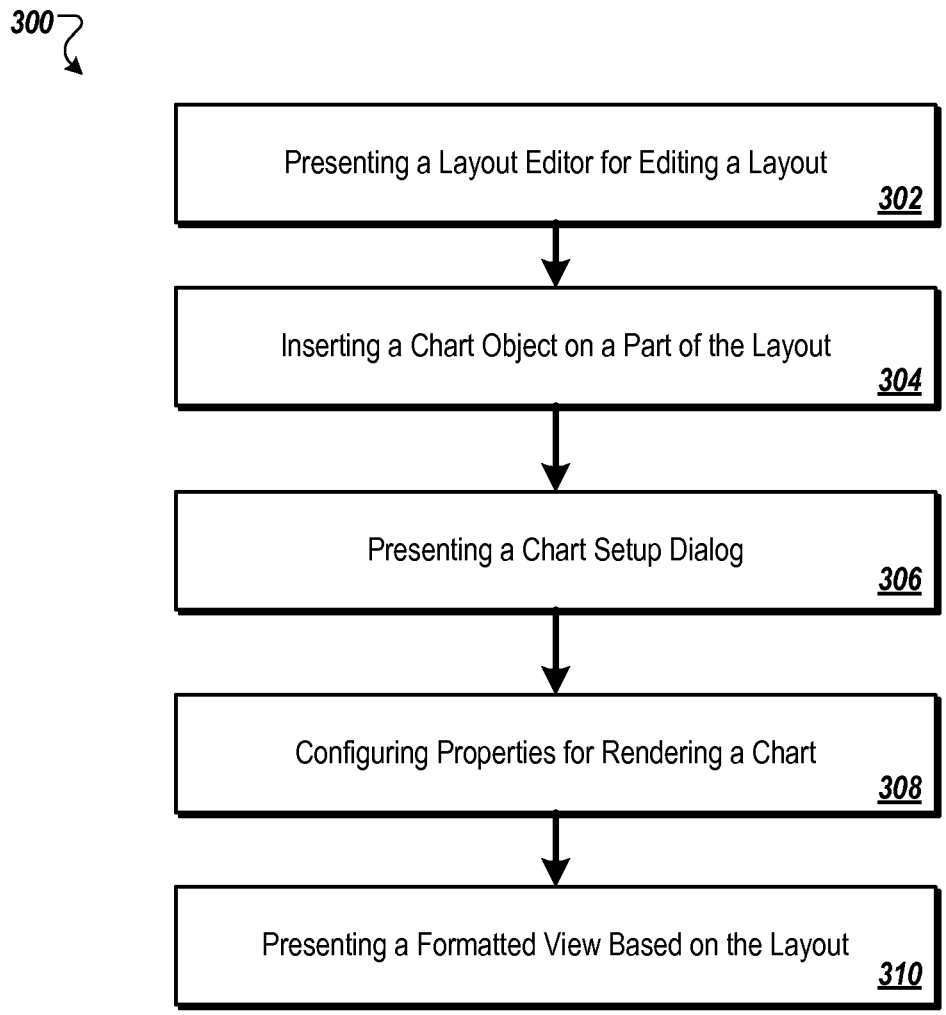
FIGS. 3A-3C are flowcharts illustrating exemplary processes for implementing context-aware charting.
Figure 3B:
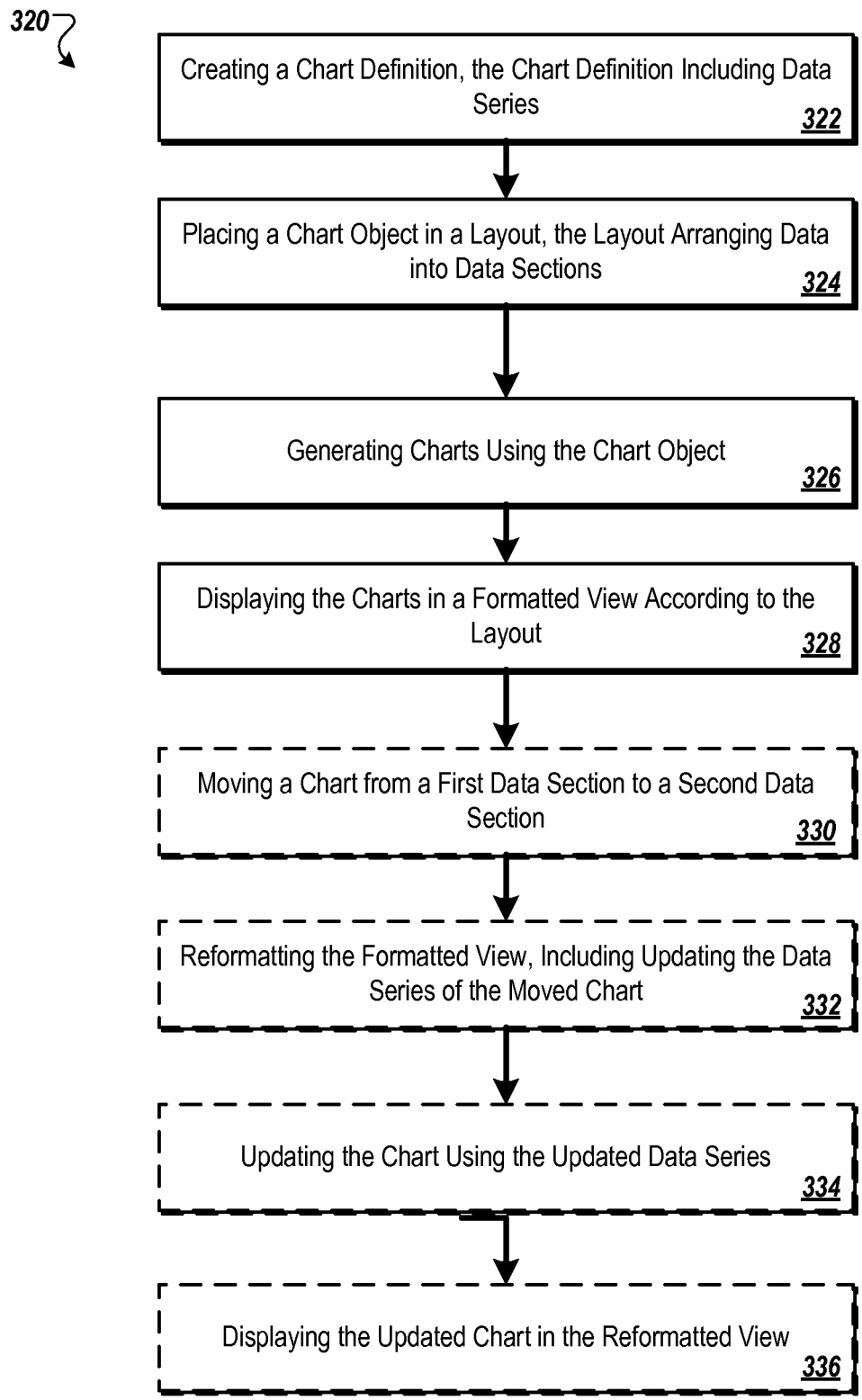
Figure 3C:
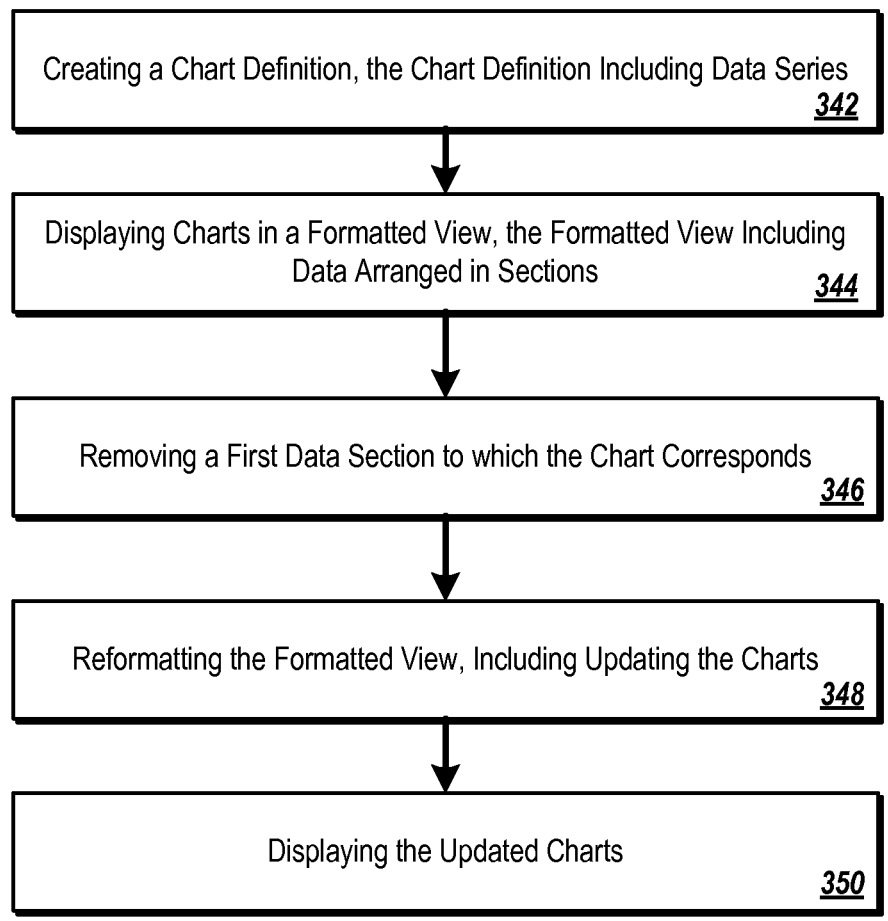

FIGS. 3A-3C are flowcharts illustrating exemplary processes 300, 320, and 340 for implementing context-aware charting. For convenience, exemplary processes 300, 320, and 340 will be described with respect to a system that performs operations in processes 300, 320, and 340.

FIG. 3A is a flow chart illustrating an exemplary process 300 in which the system creates context-aware charts following instructions received from one or more user interfaces. The system can present (302) a layout editor for editing a layout (e.g., layout 104) for a database application program. The database application program can present user interfaces in multiple modes. Some example modes are browse mode (in which a user can enter and edit information in data fields), layout-editing mode (in which a user can determine how information in data fields is presented on screen and in printed reports), find mode (in which a user can specify criteria for finding a set of records), and preview mode (in which a user can see how layouts will look when a report is printed), etc. The system can present the layout editor in response to a user input, the user input selecting a layout-editing mode.

In various modes, the user can add a chart to the database application program. The system can render a chart in various manners, including displaying a chart object on screen (e.g., in layout editing mode), or displaying a chart instance that corresponds to data (e.g., in browse mode). For example, in layout mode, the system can render the chart object (e.g., chart object 122) on each layout section (e.g., header section 106) using sample data, if the user instructs the system to do so (e.g., by selecting an option "View→Show→Sample Date" menu item in a View menu). If the user does not make such a selection, the system can display the chart object using a chart icon or generic graphic. In browse mode (e.g., when a formatted view is presented), find mode, or preview mode, the system can render a chart instance using chart definition 102, the placement of the chart object 122 in layout 104, and real data from a database.

The system can insert (304) a chart object into a part of layout 104 upon receiving a user invocation. The user can invoke context-aware charting functionality by inserting the chart object on any part of layout 104. In some implementations, the user can insert the chart object to layout 104 by selecting a menu command or by clicking on a button on a toolbar in a status area of the layout editor.

The system can present (306) a chart setup dialog. If a chart object has already been placed in a certain part of layout 104, and the user wishes to modify the chart object (including the geometry, position, or chart definition 102), the user can open the chart setup dialog by invoking a "Chart Setup . . . context" menu command on the chart object (e.g., by right clicking on the chart object or by double clicking on the chart object).

The system can configure (308) properties for rendering the context-aware chart upon receiving user input through the chart setup dialog. Through the chart setup dialog, the user can specify all properties that are required to render charts. These properties (a.k.a. chart specifications) can include data series, chart type, labels, color scheme, legend, etc. A preview rendering of the chart can be shown on the dialog to give feedback to the user and to allow the user to experiment with all the chart properties. Chart definition 102 can include the chart specifications.

The system can present (310) a formatted view based on the layout. When the user switches to browse, find, or preview mode from the layout-editing mode, chart instances (e.g., 232) can be rendered based on the chart objects (e.g., 126) specified on layout 104. Rendering the chart instance can include drawing a chart in the formatted view according to the chart specification. In some implementations, the system can render chart instances in find mode the same as in browse mode, because the visualized data in chart instances can help the user to construct a find request.

FIG. 3B is a flowchart illustrating an exemplary process 320 for generating context-aware charts. The system can create (322) chart definition 102 based on input. Chart definition 102 can include one or more data series. The term "data series" is used in this specification to refer to a data set or data sets based on which a chart is drawn. For example, a data series can be an ordered collection of elements. A data series can have a length, which can be a number of elements in the series. For example, the following number sequence forms a numerical series: [2, 5, 9, 12, 1, 2, 2, 3] which has a length of 8. Another sequence, ["apple," "orange," "pear"] can form a string series of fruit names which has a length of 3.

The system can utilize two types of data series in chart definition 102: an x-axis series and a y-axis series. For a bar, column, line, or area chart, the x-axis series can specify the values on the x-axis. The y-axis series can specify the values on the y-axis. A user can specify multiple x-axis series for the y-axis series. In this scenario, the system can perform multiple series charting (e.g., multi-charting), which can include drawing layers of graphics on a z-axis.

When chart definition 102 specifies a chart type to be a pie chart, the x-axis series can specify a name (e.g., a label for a slice of the pie). The y-axis can specify relative magnitudes, or size, or percentage of each slice of the pie. In some implementations, the system can limit the number of values of x-axis series based on the number of values of the y-axis series.

The x-axis and y-axis series in chart definition 102 can have the same length. However, if the x-axis series is longer then the y-axis, the system can extend the y-axis series and pad it with a value of zero at the end to match the x-axis' length. If the y-axis series is longer than the x-axis series, the system can extend the x-axis series and pad it with a value of zero at the end to match the y-axis' length.

The system can collect data defined in the series defined in chart definition 102 using a variety of ways. In some implementations, the system can extract values from a delimited string and use the extracted values to form the data series. A delimiter token in the string can be a space, comma, tab, return character, or any other token that is not in the string being delimited. The system can provide the function of collecting data using delimited strings for users who wish to use custom values for their series.

In some implementations, the system can populate a data series of chart definition 102 using data from a record set that was not a result of join operation. Values extracted from each record in a record set will form the data series. Using data from a record set can allow users to chart their data from a table.

In some implementations, the system can populate a data series of chart definition 102 using data from a record set resulting from a join operation. These implementations can be applicable when there is more than one table from which data in the data series are retrieved, and there is a relationship between the tables according to a database schema. The values extracted from each table in a joined record set can form the data series. This mode can allow users to fully exploit relationships in their data. In addition, this mode can add dynamism to the charting feature. The data series for the chart will change depending on the current record.

Referring again to FIG. 3B, a chart object (e.g., chart object 126) can be placed (324) in a display area of a user interface (e.g., layout 104). The chart object can be based on chart definition 102. The user interface can be used to arrange data into multiple data sections. The chart object can be placed in one of the data sections. A user can also adjust the geometry (e.g., size and shape of chart instances to be drawn) and position for the chart object.

The system can generate one or more chart instances (e.g., one or more chart 134) using the chart object (e.g., chart object 126) placed in the layout (326). Data series of each chart can be adapted to the data section in which the chart is located. Adapting the data section can include performing calculations on data in the data section. In this specification, the term "calculation" can include an expression whose input is a record (e.g., one or more data values retrieved from a database table) and whose output is some value. A calculation can reference any field value of a record and perform various operations on the field value (e.g., mathematical manipulation, string operation, etc.).

A calculation can support string manipulation operations. Thus, the calculation can return a result as a delimited string from a given record (e.g., either by creating an auto-enter calculation of a field definition that returns a delimited string or by specifying series calculation to return delimited string data values). In some implementations, a user interface can be designed to hide the complexity and power that the calculation provides (e.g., by allowing only application programmers, rather than application users, to define, view, or edit the calculation). In some implementations, the system can expose all the power (and complexity) that a calculation can provide later on to all users, including programmers and end users.

The system can display (328) the chart instances (e.g., chart instances 130, 132, 134, or 136) in a formatted view according to the layout. The formatted view can be a browse view, a find view, or a preview. Displaying chart instances 130, 132, 134, or 136 can include performing calculations on the data series with respect to each of chart instances 130, 132, 134, and 136, including, for example, adapting the x-axis series based on the location of a chart and calculating the y-axis series using data corresponding to the x-axis series.

In some implementations, process 320 can further include moving (330) a chart from a first data section to a second data section. Moving a chart can include, for example, moving chart object 124 from body section 108 to inner summary section 110 or outer summary section 112, or moving chart object 126 from inner summary section 110 to outer summary section 112, or moving a chart object from outer summary section 112 to inner summary section 110 or to body section 108.

Moving a chart object from a first summary section to a second summary section can include recalculating the data series included in chart definition 102 using data of the second summary section. Recalculating the data series can include applying data selection rules associated with the second level summary section. The system can use data selection rules to adapt chart definition 102 to various contexts. For example, if a user moves chart object 126 from inner summary section 110 to outer summary section 112, the system can use a sum of number of happy people in each city as a y-axis data series (which can be calculated for chart object 126), instead using a sum of happy people for every record in body section 108, to improve calculation efficiency.

In some implementations, in addition to allowing a user to move a chart object on layout 104 in layout edit mode, the system can allow a user to move a chart instance in a view mode (e.g., a browse, find, or preview mode). For example, the system can allow a user to drag and drop a chart instance on formatted view 230. Thus, a context-aware chart can change its content in real time.

In some implementations, process 320 can further include reformatting (332) the formatted view, including updating the data series of the moved chart such that the data series of the moved chart correspond to the second data section. Updating the data series can include identifying a new context of the data series using various rules, and repopulate the data series (e.g., recalculating a y-axis data series). Updating the data series can result in the moved chart to correspond to the new data section.

In some implementations, process 320 can further include updating (334) the chart using the updated data series. For example, chart instances 232, 234, 236, 238, and 240 (where the y-axis data series correspond to numbers of happy people per city) can be updated into chart instances 252 and 254 (where the y-axis data series correspond to numbers of happy people per country), based on the move of chart object 126.

In some implementations, process 320 can further include displaying (336) the updated chart in the reformatted view. The updated chart (or charts) can be displayed in the second data section (e.g., the data section into which the charts moved). Displaying the updated chart instances in the reformatted view can result in a change of the total number of chart instances displayed. For example, in formatted view 230, there can be five chart instances 232, 234, 236, 238, and 240; in reformatted view 250, there can be two chart instances 252 and 254.

FIG. 3C is a flowchart illustrating exemplary process 340 for implementing context-aware charting when a data section is removed. The system can create (342) chart definition 102 based on input. Chart definition 102 can include one or more data series.

The system can display (344) one or more chart instances in a formatted view (e.g., 230). The formatted view can include data arranged into multiple data sections (e.g., cities and countries). The chart instances can correspond to chart definition 102 and at least one of the data sections. The data sections each can have a level. For example, inner summary section 110 (grouped by cities) can have a first level. Outer summary section 112 (grouped countries) can have a second level, etc.

The system can remove (346) a data section to which a chart corresponds, in response to an input. For example, a user can remove outer summary section 112 from layout 104 using a layout editor. The system can allow a user to remove outer summary section 112 by, for example, clicking on outer summary section 112 in the layout editor and select "delete" from a menu. In some implementations, the system can allow the user to remove outer summary section 112 in a view mode (e.g., a browse mode).

The system can reformat (348) the formatted view. In some implementations, the system can delete chart objects in the removed data section. For example, the system can delete chart object 126 if a user removes data section 110 from layout 104. In some implementations, the system can keep the chart objects even after a user has removed the data section in which the chart object resides (for example, in order to preserve complex data series definitions in chart definition 102). Chart object 126 can be automatically moved to data section 108 or data section 112. Therefore, reformatting the formatted view can include updating the chart instances such that the data series of the chart instances correspond to new data section. New data section 108 can have a level (which can be zero) that is one step lower (e.g., one step closer to body section 108) than original data section 110. New data section 112 can have a level (which can be two) that is one-step higher (e.g., one step farther away from body section 108) than original data section 110.

For example, in some implementations, if a user removes inner summary section 110 in which chart object 126 is located, the system can present a user interface and ask the user how to process chart object 126. A user can choose to delete chart object 126, move chart object 126 to a lower level, or move chart object 126 to a higher level. If the user chooses to move chart object 126 to a lower level, the system can automatically move chart object 126 to body section 108. If the user chooses to move chart object 126 to a higher level (e.g., farther away from body section 108), the system can automatically move chart object 126 to outer summary section 112.

The system can display (350) the updated chart instances in the reformatted view. Updated chart instances can be repeated according the new data section they are in. For example, chart instances 252 and 254 can be repeated for each country, instead of each city, after chart object 126 is moved from inner summary section 110 to outer summary section 112.

Exemplary Data View and Layout

Figure 4A:
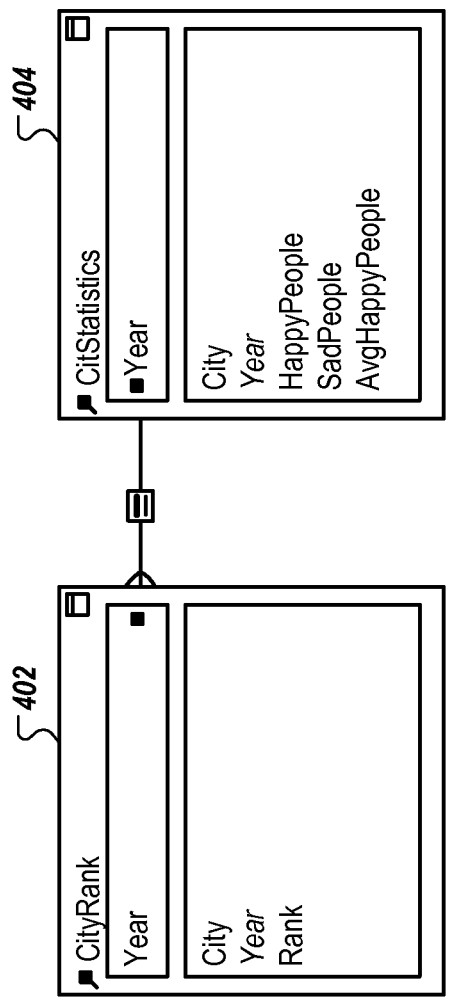

FIGS. 4A and 4B illustrate an exemplary data view 410 for context-aware charting. FIG. 4A illustrates underlying database tables 402 and 404 from which data are retrieved for display in data view 410. Table 402, named CityRank, can contain data fields city, year, and rank. Table 404, named CitStatics, can contain data fields city, year, HappyPeople (for number of happy people), SadPeople (for number of sad people), and a calculated field AvgHappyPeople (which is an average of number of happy people for all cities and all years). The system can retrieve data in tables 402 and 404 and display the data in a data view. The data view can include one or more context-aware charts.

FIG. 4B illustrates exemplary data view 410. Data view 410 can be a part of a formatted view (e.g., 230 or 250) of a found set. A found set can be a set of records in one or more database tables that are made active by a find request (which can include user specified criteria for finding a set of records). An example found set is a result set retrieved from a database by one or more queries. Data view 410 can include multiple rows corresponding to multiple data sections in a layout.

For example, header row 412 can correspond to header section 106 of layout 104. Labels in header row 412 ("City," "Year," etc.) can include either column names in tables 402 and 404 or boilerplate text, or a combination of the two. Record rows 414, 416, 420, 422, 424, 428, and 430 can correspond to body section 108 of layout 104, which repeats by year. Sub-summary rows 418, 426, and 432 can correspond to inner summary section 110 of layout 104. Sub-summary rows can summarize number of happy people group by each city (e.g., New York, Ottawa, and San Jose). In some implementations, the system can require the data records in each sub-summary group be sorted. In this example, the records in each sub-summary group are sorted by year.

Data view 410 can include grand summary row 434, which can include outer-most summary data field. It should be noted that neither sub-summary row 418, 426, or 432 nor grand summary row 434 is required to display a "summary" of the records in a group literally. The data fields in summary rows can include any data that are related to the entire group, e.g., an average value (as illustrated), a minimum value, a maximum value, or other calculated value of the data in the group.

Data view 410 can include context-aware chart instances in various rows, depending on the placement of the chart object in layout 104. Data view 410 is shown in a tabular form for clarity. Data view 410 can have other forms (e.g., a list). Specifications of each row (e.g., height, color, font, and whether the row includes a chart, etc.) can be determined by corresponding sections in layout 104.

Figure 5:
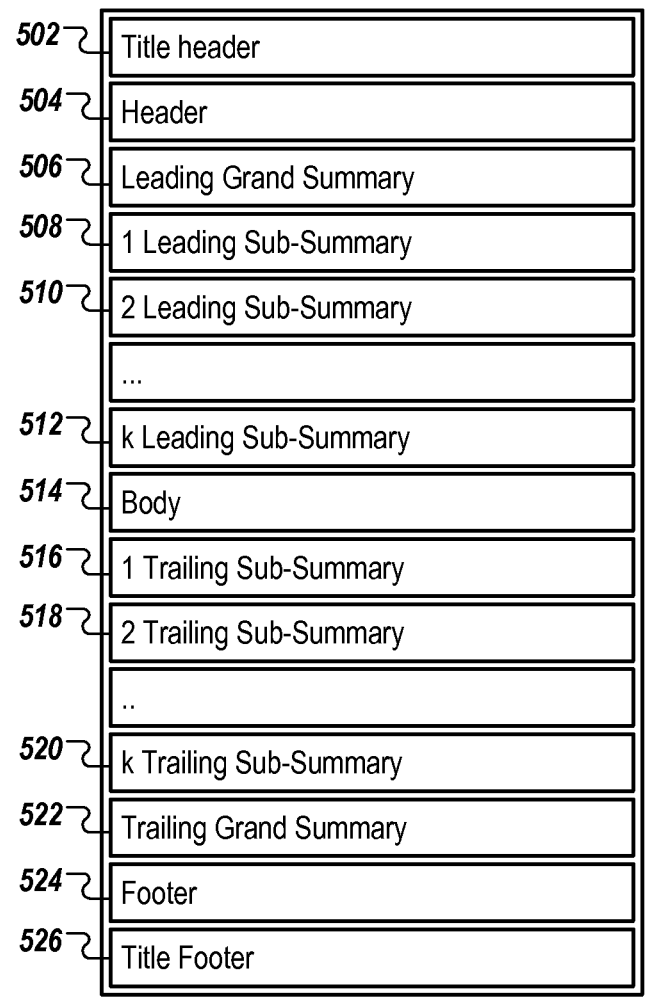
FIG. 5 illustrates an exemplary implementation of a layout that contains sub-summary data sections.

FIG. 5 illustrates an exemplary layout 500 that contains sub-summary data sections in which context-aware chart objects can be placed. Layout 500 in FIG. 5 can be a table layout or a list layout. Layout 500 can contain multiple parts, including title header section 502, header section 504, leading grand summary section 506 (e.g., for displaying a total number of happy people of all regions), leading outer sub-summary section 508 (e.g., for displaying number of happy people in each country), leading mid-level sub-summary section 510 (e.g., number of happy people in each state), and leading inner sub-summary section 512 (e.g., number of happy people each in each city). There can be other levels of leading sub-summary sections. The parts are "leading" because they are placed ahead of body section 514.

Layout 500 can include body section 514 which contains repeating data fields (e.g., rows corresponding to the rows in the database tables), multiple levels of trailing sub-summary sections 516, 518, and 520, trailing grand summary section 522, footer 524, and title footer 526. Each section can contain one or more objects (e.g., chart objects, boilerplate text, images, or data fields). The sections and the objects can be stored as nodes in a tree structure. The specifications of the sections and the objects (e.g., size, position) can be stored in the nodes.

Each summary section can have a level that measures a relative distance between the summary section and body section 514. For example, leading sub-summary section 512 and trailing sub-summary section 516 can each have a level of one, because they are one step away from body section 514. Body section 514 can have a level of zero. A summary section can be an inner summary section relative to another summary section if the level of the first summary section is lower than the other summary section. The other summary section can be an outer summary section of the first summary section. For example, trailing sub-summary section 518 can be an outer summary section of trailing sub-summary section 516, and an inner sub-summary section of trailing sub-summary section 520.

The levels of the data sections can also relate to a sorting level. Sub-summary sections can be nested to reflect the fact that sorting operations can be nested. The following example will be used to illustrate the levels of data sections, the data sections providing contexts of charts.

An exemplary table (Table 1) can store records on sales by country, city, year:

TABLE 1

| | Sub-summary Level | | | |
|---|---|---|---|---|
| | 3 | 2 | 1 | 0 |
| Record No. | Country | City | Year | Sales |
| 1 | CAN | OT | 2008 | 1 |
| 2 | CAN | OT | 2009 | 2 |
| 3 | US | NY | 2008 | 3 |
| 4 | US | NY | 2009 | 4 |
| 5 | US | LA | 2008 | 5 |
| 6 | US | LA | 2009 | 6 |

The sub-summary level can indicate a sorting priority for each data section. Each sub-summary level can map to a set of records depending on context of the records, because the level is mapped to the sorting level. On layout 500, data section for "Sales" can correspond to body 514; "Years," 512; "City," 510; and "Country,"508.

A chart object put in various sub-summary sections can have various contexts and use various subsets data. For example, a chart object put in sub-summary level 3 (e.g., in sub-summary section 508 on layout 500) can use the following set of records:

TABLE 2

| US NY 2008 3 |
| US NY 2009 4 |
| US LA 2008 5 |
| US LA 2009 6 |

In the above example, the sort level is specified by a field ("Country"). A chart object can require all records of each country (e.g., "US").

If the same chart object is put in sub-summary level 2 (e.g., in sub-summary section 510 on layout 500), the chart object can require all records of each city (e.g., "NY"). The data used for charting can include the following set of records:

TABLE 3

| US NY 2008 3 |
| US NY 2009 4 |

In various implementations, the system imposes various rules on the placement of objects in the sections. For example, a placement rule can specify that objects in a leading section (e.g., a leading grand summary section or a leading sub-summary section) are placed at the bottom of the section, and objects in a trailing part are placed at the top of the trailing part. This placement rule can make the objects appear close to the body section, which can contain data that the object summarizes, in the final display view. A sizing rule can specify that the size of each of the leading and trailing sub-summary sections, measured by rows that represent a number of objects in the section, be one more than the number of objects in the section. An alignment rule can specify that text in a sub-summary field be aligned using the same text alignment rule as in the field whose data the sub-summary field summarizes. These rules also apply to chart instances within the sections.

Each part in layout 500 can have multiple instances. For example, body part 514 can have one instance for each data record (e.g., row of data) returned from the database. Leading sub-summary part 512, which sub-summarizes data for each city, can have one instance for each city.

Exemplary Data Series Adaptation Policies

In various implementations of context-aware charting, the data series of chart objects can be dynamically adapted to the context of the chart object. A system can implement various rules, or policies, to specify how to automatically identify or change data source of the data series based on the context.

Context for data of a context-aware chart object (e.g., chart object 122, 124, 126, or 128) can dependent upon a part of a layout (e.g., layout 104) in which the chart object is placed. A context record set can be used to populate data series defined in chart definition 102. The term "context record set" can refer one or more records that are used to evaluate charting calculations (e.g., form data series in a chart). A system can dynamically determine a context record set for a context-aware chart object, based on the placement of the chart object. Dynamic determination of chart context can give the chart object the ability to visualize data such that a chart instance generated based on the chart object makes sense depending upon the layout part in which the chart object is placed.

For example, when chart object 122 is placed in a header or footer section (e.g., header section 106), the system can use an entire found set as a context record set of chart object 122. In some implementations, when chart object 124 is placed in a body section 108, the system can use an entire found set as a context record set of chart object 124. Alternatively, in some implementations, the system can use a particular record in the found set as the context record set of chart object 124.

When chart object 126 is placed in a sub-summary part (e.g., summary part 110 or 112), record set in a sorted group corresponding to the sub-summary part can be used as the context record set of chart object 126. The sorted group can be a subset of the found set that corresponding to a level of the sub-summary. For example, if the level of the sub-summary is "city," sorted groups can include records for "Ottawa," "San Jose," or "New York." The subset can be sorted base on sort criteria corresponding the level of the sub-summary. For example, records in groups "Ottawa," "San Jose," and "New York" can be sorted on the same criteria.

When a chart object is placed in a grand summary part, the system can identify a record set that has one record in each sorted sub-summary group at the outer-most level sub-summary group (e.g., the sub-summary group that is furthest away from a body section) and use the identified record set as context record set of the chart object.

To implement dynamic determination of chart context, the system can apply various data selection rules and policies for context record set in various situations.

The system can apply input record set rules to chart objects in header section 106, a footer section, or body section 108 of layout 104. A chart object on the header, footer, and body (e.g., chart objects 122 and 126) can uses either a current record or a current found set associated with layout 104 as input to evaluate data series and chart calculations. The system can apply the following exemplary rules for chart objects in a header, footer, or body context:

For chart title, x-axis title, y-axis title calculations:
 For a chart object on the header or footer, the input record to evaluate chart calculations can include the current record (e.g., a record that is active on the layout).
 For a chart object on the body, the input record to evaluate chart calculations can include the body's record on the layout.

For a series specification whose data source is delimited values:
 For a chart object on the header or footer, the input record to evaluate the calculation can include the current record on the layout.
 For a chart object on the body, the input record to evaluate the calculation can include the body's record on the layout.

For a series specification whose data source is the current found set, the input record set to evaluate the calculation can include the found set of the layout.

For a series specification whose data source is related records from a related table:
 For a chart object on the header or footer, the input record set to evaluate the calculation can include the record set that is created after a join operation is applied (done against the current record and the related table).
 For a chart object on the body, the input record set to evaluate the calculation can include the record set that is created after the join operation is applied (done against the body's record and the related table).

When chart object 126 or 128 is placed in a summary section 110 or 112, the system can apply another set of input record set rules when the summary section 110 or 112 corresponds to sub-summary data. Sub-summaries can be viewed as "inner summaries" because, relative to grand summaries, sub-summaries can be closer to a body section. Sub-summaries can be used to summarize a group of records that have common sorting criteria. The user can create sub-summaries after sorting the found set using the common sorting criteria.

Therefore, in some implementations, chart object 126 on a summary section 110 of layout 104 can use records that are in the particular sorted group to evaluate the calculations in chart object 126. The system can implement the following rules for chart objects in a sub-summary context:

For chart title, x-axis title, and y-axis title calculations:
 For a chart object on a leading sub-summary, the input record to evaluate these calculations can include the first record in the sorted group.
 For a chart object on a trailing sub-summary, the input record to evaluate these calculations can include the last record in the sorted group.

For a series specification whose data source is delimited values:
 For a chart object on a leading sub-summary, the input record to evaluate the calculation can include the first record in the sorted group.
 For a chart object on a trailing sub-summary, the input record to evaluate the calculation can include the last record in the sorted group.

For a series specification whose data source is the current found set, the input records to evaluate the calculation can include every record in the sorted group.

For a series specification whose data source is the related records:
 For a chart object on a leading sub-summary, the input record set to evaluate the calculation can include the record set that is created after the join operation is applied (done against the first record in the sorted group and the related table).
 For a chart object on a trailing sub-summary, the input record set to evaluate the calculation can include the record set that is created after the join operation is applied (done against the last record in the sorted group and the related table).

When a chart object a summary section that corresponds to a grand summary, the system can apply another set of input record set rules. Grand summaries can be viewed as "outer summaries" because, compared to sub-summaries, grand summaries can be farther away from the body. Grand summaries can be used to provide an overall summary of the entire found set. Therefore, in some implementations, a chart object in a grand summary section can be allowed to summarize summary information of each sub-summary group. The system can implement the following rules for chart objects in a sub summary context:

For chart title, x-axis title, and y-axis title calculations:
 For a chart object on a leading grand summary, the input record to evaluate these calculations can include the first record in the layouts found set.
 For a chart object on a trailing grand summary, the input record to evaluate these calculations can include the last record in the layouts found set.

For a series specification whose data source is delimited values:
 For a chart object on a leading grand summary, the input record to evaluate the calculation can include the first record in the layouts found set.

For a chart object on a trailing grand summary, the input record to evaluate the calculation can include the last record in the layouts found set.

In some implementations, the system can apply rules to the data series in chart objects to accommodate users who want to chart summary information in each sub-summary group (e.g., number of happy people in each city or each country, through years). Therefore, the system can form data series for x-axis calculation using values of sorting criteria (e.g., year). Thus, the system can specify the following rules for data series:

In chart objects whose data source is the current found set:

For a chart object on a leading grand summary, the input records to evaluate the calculation can include every first record in the sorted group.

For a chart object on a trailing grand summary, the input records to evaluate the calculation can include every last record in the sorted group.

For a series specification whose data source is related records:

For a chart object on a leading grand summary, the input record set to evaluate the calculation can include the record set that is created after the join operation is applied (done against the first record in the layouts found set and the related table).

For a chart object on a trailing grand summary, the input record set to evaluate the calculation can include the record set that is created after the join operation is applied (done against the last record in the layouts found set and the related table).

In some implementations, the system can use the entire found set as the source of a context-aware chart if the data are not sorted. For example, the system can treat a chart as like a chart in a header or footer section if no sorting information is available (e.g., in exception handling situations.)

Example System Architecture

Figure 6:
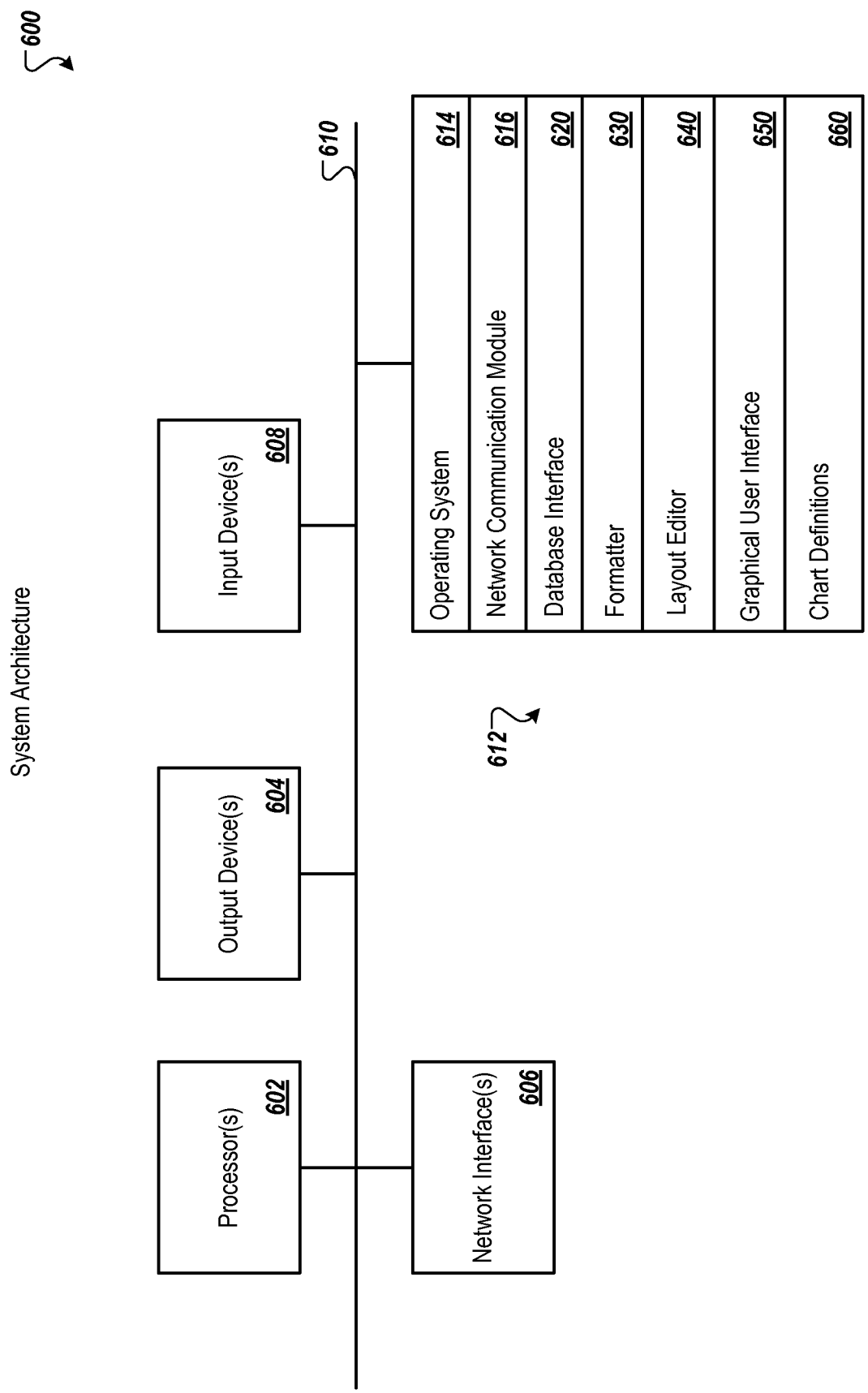
FIG. 6 is a block diagram of an exemplary system architecture for implementing the features and operations described in reference to FIGS. 1-5.

FIG. 6 is a block diagram of exemplary system architecture 600 for implementing the features and operations described in reference to FIGS. 1-5. Other architectures are possible, including architectures with more or fewer components. In some implementations, architecture 600 includes one or more processors 602 (e.g., dual-core Intel® Xeon® Processors), one or more output devices 604 (e.g., LCD), one or more network interfaces 606, one or more input devices 608 (e.g., mouse, keyboard, touch-sensitive display) and one or more computer-readable mediums 612 (e.g., RAM, ROM, SDRAM, hard disk, optical disk, flash memory, etc.). These components can exchange communications and data over one or more communication channels 610 (e.g., buses), which can utilize various hardware and software for facilitating the transfer of data and control signals between components.

The term "computer-readable medium" refers to any medium that participates in providing instructions to processor 602 for execution, including without limitation, non-volatile media (e.g., optical or magnetic disks), volatile media (e.g., memory) and transmission media. Transmission media includes, without limitation, coaxial cables, copper wire and fiber optics.

Computer-readable medium 612 can further include operating system 614 (e.g., Mac OS® server, Windows® NT server), network communication module 616, database interface 620, formatter 630, layout editor 640, graphical user interface 650, and chart definitions 660, as described in reference to FIGS. 1-5. Operating system 614 can be multi-user, multiprocessing, multitasking, multithreading, real time, etc. Operating system 614 performs basic tasks, including but not limited to: recognizing input from and providing output to devices 606, 608; keeping track and managing files and directories on computer-readable mediums 612 (e.g., memory or a storage device); controlling peripheral devices; and managing traffic on the one or more communication channels 610. Network communications module 616 includes various components for establishing and maintaining network connections (e.g., software for implementing communication protocols, such as TCP/IP, HTTP, etc.). Layout manager 640 can include one or more chart object managers. Chart definitions 660 can include chart specifications, which can include dynamic data series.

Architecture 600 can be included in any device capable of hosting a database application program. Architecture 600 can be implemented in a parallel processing or peer-to-peer infrastructure or on a single device with one or more processors. Software can include multiple software components or can be a single body of code.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

A number of implementations of the invention have been described. Nevertheless, it will be understood that various modifications can be made without departing from the spirit and scope of the invention. Accordingly, other implementations are within the scope of the following claims.

For example, varies types of charts (e.g., line charts) are shown for illustrative purposes. Other types of charts (e.g., pie charts, bar charts, timeline charts, area charts, bubble histograms, bubble charts, radar charts, or any other types of charts) are within the scope of the claims. Furthermore, the shapes of the lines in the exemplary charts are shown for illustrative purpose only.

What is claimed is:

1. A computer-implemented method, comprising:
    creating, by a computing device, a chart object including chart definition, the chart definition including a data series that specifies at least one data dimension of a chart;
    placing, by the computing device, the chart object in a first display area of a user interface, the user interface configured to display data at a plurality of summary levels, each summary level corresponding to a level of grouping of the data, the first display area corresponding to a first summary level of the summary levels;
    determining, by the computing device and based on placement of the chart object in the first display area and the data series, a data source for generating one or more charts, the data source corresponding to the first summary level; and
    moving, by the computing device and responsive to an input, the chart object from the first display area to a second display area of the user interface, the second display area corresponding to a second summary level of the summary levels, wherein a motion of the chart object triggers a change of data source of the data series from the first summary level to the second summary level, wherein a location of the chart object in the user interface determines into how many charts the chart object is rendered in a formatted view, wherein, when the chart object is located in the first display area, the computing device renders the chart object into a first number of charts in the formatted view, and when the chart object is located in the second display area, the computing device renders the chart object into a second number of charts in the formatted view.

2. The method of claim 1, wherein:
    the user interface comprises a layout defining sections of the formatted view of data, the layout including multiple rows, the first display area including a first row of the rows, the second display area including a second row of the rows; and
    moving the chart object comprises moving the chart object from the first row to the second row, wherein the chart object is displayed in a view of the layout, each of the first number of charts and the second number of charts are displayed in the formatted view of data, the formatted view of data being generated from the layout and data records, the formatted view of data being different from the view of the layout.

3. The method of claim 2, wherein moving the chart from the first display area to the second display area includes moving the chart object from the first row defining a body section of the formatted view to the second row defining a summary section of the formatted view.

4. The method of claim 2, wherein reinterpreting the data source includes recalculating data of the data dimension specified by the data series included in the chart definition based on the second summary level.

5. The method of claim 4, wherein recalculating the data further includes applying data selection rules associated with the second summary level.

6. The method of claim 1, wherein:
    the first summary level is an outer summary section; and
    the second summary level is an inner summary section.

7. A non-transitory computer storage device storing a computer program product, the computer program product operable to cause data processing apparatus to perform operations comprising:
    creating a chart object including chart definition, the chart definition including a data series that specifies at least one data dimension of a chart;
    placing the chart object in a first display area of a user interface, the user interface configured to display data at a plurality of data summary levels, each summary level corresponding to a level of grouping of the data, the first display area corresponding to a first summary level of the summary levels;
    determining, based on placement of the chart object in the first display area and the data series, a data source for generating one or more charts, the data source corresponding to the first summary level; and
    moving, responsive to an input, the chart object from the first display area to a second display area of the user interface, the second display area corresponding to a second summary level of the summary levels, wherein a motion of the chart object triggers a change of data source of the data series from the first summary level to the second summary level, wherein a location of the chart object in the user interface determines into how many charts the chart object is rendered in a formatted view, wherein, when the chart object is located in the first display area, the data processing apparatus renders the chart object into a first number of charts in the formatted view, and when the chart object is located in the second display area, the data processing apparatus renders the chart object into a second number of charts in the formatted view.

8. The device of claim 7, wherein:
    the user interface comprises a layout defining sections of the formatted view of data, the layout including multiple rows, the first display area including a first row of the rows, the second display area including a second row of the rows; and
    moving the chart object comprises moving the chart object from the first row to the second row.

9. The device of claim 8, wherein moving the chart from the first display area to the second display area includes moving the chart object from the first row defining a body section of the formatted view to the second row defining a summary section of the formatted view.

10. The device of claim 8, wherein reinterpreting the data source includes recalculating data of the data dimension specified by the data series included in the chart definition based on the second summary level.

11. The device of claim 10, wherein recalculating the data further includes applying data selection rules associated with the second summary level.

12. The device of claim 7, wherein:
the first summary level is an outer summary section; and
the second summary level is an inner summary section.

13. A system comprising:
one or more processors;
a non-transitory storage device storing instructions configured to cause the one or more processors to perform operations comprising:
creating a chart object including chart definition, the chart definition including a data series that specifies at least one data dimension of a chart;
placing the chart object in a first display area of a user interface, the user interface configured to display data at a plurality of data summary levels, each summary level corresponding to a level of grouping of the data, the first display area corresponding to a first summary level of the summary levels;
determining, based on placement of the chart object in the first display area and the data series, a data source for generating one or more charts, the data source corresponding to the first summary level; and
moving, responsive to an input, the chart object from the first display area to a second display area of the user interface, the second display area corresponding to a second summary level of the summary levels, wherein a motion of the chart object triggers a change of data source of the data series from the first summary level to the second summary level, wherein a location of the chart object in the user interface determines into how many charts the chart object is rendered in a formatted view, wherein, when the chart object is located in the first display area, the one or more processors render the chart object into a first number of charts in the formatted view, and when the chart object is located in the second display area, the one or more processors render the chart object into a second number of charts in the formatted view.

14. The system of claim 13, wherein:
the user interface comprises a layout defining sections of the formatted view of data, the layout including multiple rows, the first display area including a first row of the rows, the second display area including a second row of the rows; and
moving the chart object comprises moving the chart object from a first row to a second row.

15. The system of claim 14, wherein moving the chart from the first display area to the second display area includes moving the chart object from the first row defining a body section the second row defining of the formatted view to a summary section of the formatted view.

16. The system of claim 14, wherein reinterpreting the data source includes recalculating the data series included in the chart definition using data of the second summary level.

17. The system of claim 16, wherein recalculating the data series further includes applying data selection rules associated with the second summary level.

18. The system of claim 13, wherein:
the first summary level is an outer summary section; and
the second summary level is an inner summary section.

* * * * *